3,042,535
AGGREGATE TREATMENT

Carl L. Hiltrop and John Lemish, Ames, Iowa, assignors to Iowa State College Research Foundation, Ames, Iowa, a corporation of Iowa
No Drawing. Filed July 22, 1959, Ser. No. 828,682
3 Claims. (Cl. 106—85)

This invention relates to aggregate treatment and, more particularly, to the treatment of rocks useful as aggregate in concrete wherein the physical properties of the aggregate are improved and which is productive of a concrete having improved resistance to failure. The aggregate portion of concrete which may constitute 80% or so of the concrete often includes argillaceous carbonate and dolomitic rocks. We have noted that such rocks develop a shell at their surfaces when incorporated in concrete. The development of these shells is attended by a general weakening of the concrete itself so that there is an increased possibility of failure. Highway sections which have proven unsatisfactory in service were noted to possess these shells on the periphery of the carbonate aggregate. The shell portions we have termed "reaction shell" and it has been demonstrated that these reaction shells are richer in silica than was the original host rock. Thus it seems that silica in some mobile form, had migrated from the siliceous cement paste and had been deposited within the carbonate aggregate forming a less soluble, more siliceous "reaction shell." Highway sections wherein the aggregate shells were lacking have proved uniformly stronger and more resistant to failure. For the most part, the rocks lacking the reaction shells can be characterized as lacking argillaceous components, i.e., illitic clays.

It is a general object of this invention to provide a method of treating rocks, such as are useful in providing the aggregate portion of concrete and especially argillaceous limestone and dolomites whereby the physical properties of such rocks are materially improved. The invention also contemplates improving the argillaceous rocks to an extent that they function as well if not better than the rocks lacking reaction shells when employed as the aggregate in concrete.

Another object of the invention is to provide a novel method of treating rocks through the contacting thereof with a silicon containing gas, such as a silicon halide, or an organosiliconhalide, whereby a small quantity of the silicon-containing material is dispersed throughout the rock and renders the rock exceptionally strong for use as an aggregate in concrete. Concrete utilizing such treated materials manifests exceptional resistance to the failure ordinarily developed by the concrete being subjected to a number of freeze-thaw cycles and other stresses which would have a deleterious effect on concrete utilizing non-treated rock aggregate. This is applicable in the case of both cementitious and asphaltic concrete.

Still another object is to provide a method of treating rocks with a silicon halide gas, such as a methylchlorosilane whereby the rocks are generally benefited, especially when used in constructions subject to stress. Other objects and advantages of this invention can be seen as this specification proceeds.

In one aspect of the invention, we impregnate rock specimens with a gaseous silane. Preferably, the silane is a silicon halide with the halide moiety being bromine or chlorine. Of these, chlorine is preferred inasmuch as these silicon halides are generally inexpensive. Only a very small quantity of the silane is required for the impregnation, and it is believed that the mechanism of impregnation is attended by a molecular dispersion of the silane with the rock matrix. The silane, thus, may be silicon tetrachloride, an organic substituted chlorosilane such as dimethyldichlorosilane, methyltrichlorosilane, monomethyldichlorosilane, etc. With rocks of a size suitable for aggregate, we have found that the contact of the rock with the gaseous silane should be for a time of from a few minutes to about four days under ordinary atmospheric conditions to develop satisfactory impregnation.

Illustrative of the invention is the following example.

EXAMPLE I

Two glass desiccators were provided, each having supported therein an evaporating dish. In one evaporating dish, 25 milliliters of silicon tetrachloride was placed. In the other evaporating dish 25 milliliters of an approximately equal volume mixture of dimethyldichlorosilane and methyltrichlorosilane was placed. The desiccators were equipped with porcelain desiccator plates and 1" carbonate rock chip specimens were placed on the plate of each desiccator. The rock specimens for each desiccator were substantially identical, being of the same size, quantity and possessing the same type and amount of clay impurity. A vacuum type lid was placed on each desiccator with the vacuum vent left open to the atmosphere. Each desiccator with its contents was then placed in a hood. This precaution was taken since hydrochloric acid was generated as a byproduct of the hydrolysis. The silicon-containing materials were technical grade reagents. After one day's treatment, the rocks exposed to vaporous silicon tetrachloride were observed to possess a very noticeable insoluble reaction shell. Those rocks in the second desiccator, after having been exposed to the vaporous dimethyldichlorosilane and methyltrichlorosilane for approximately four hours, were observed to be completely water repellent throughout.

Another investigation was undertaken to determine the effect on rocks of different degrees of purity insofar as clay content was concerned. The procedure and results are set forth in Example II below.

EXAMPLE II

Three desiccators were provided with the evaporating dishes and plates enclosed and with a vented vacuum type lid. Each of the three desiccators contained an evaporating dish holding 25 milliliters of silicon tetrachloride. Three specimens were provided, each consisting of rock chips approximately one inch in diameter, the chips being oven-dried over night before the treatment was begun. The chips were also oven-dried each time before weighing. The specimen designated No. 1 contained the least clay (i.e., was the purest carbonate), while the speciment designated No. 3 contained the most clay. As can be seen from the table below, the specimen No. 1 which was the purest carbonate also showed the least gain in weight.

*Table I*

WEIGHT GAINED BY ROCK SPECIMENS

| Time in Days | Specimen Number | | |
|---|---|---|---|
| | 1 | 2 | 3 |
| 0 | 6.72 | 10.414 | 10.143 |
| 1 | 6.738 | 10.449 | 10.184 |
| 4 | 6.744 | 10.473 | 10.212 |
| 7 | 6.787 | 10.556 | 10.321 |

Based on original weight, specimen number 1, showed an increase of 0.88%, specimen number 2, 1.36% and specimen number 3, 1.75%.

In this example, the chips were placed in an atmosphere of dimethyldichlorosilane and methyltrichlorosilane between the fourth and seventh days. Thus, it appears that the organic silanes are somewhat superior in impregnating the rock specimens than the silicon tetrachlorides.

Specimens which have been treated with silicon tetrachloride were found to effervesce much more slowly than the untreated specimens when placed in 4 N hydrochloric acid. However, the pure carbonates remained noticeably more soluble in hydrochloric acid after treatment while the more inferior (i.e. more argillaceous) rocks evidenced considerably less reactivity with hydrochloric acid.

Comparing treated and untreated argillaceous limestone relative to water repellency demonstrates that the treated rocks are considerably more water repellent. It is significant to note that the water repellency effect is not limited to the exterior surface of the rocks only. After approximately four hours' treatment, rocks of about 1" diameter were broken open and were found to be water repellent throughout. The water-surface contact angle in such rocks is estimated to be about 110°.

When treated rocks were subjected to degradation with a four normal (4 N) hydrochloric acid, the carbonate was leached away very slowly leaving the insoluble argillaceous material in its original three-dimensional configuration. In contrast to this, an untreated similar specimen was completely broken down to sediment.

It is believed that the invention can be used to advantage in many situations, such as where rock materials, mortar and concrete material are employed. As is apparent from the foregoing, the treated rocks may be blended in conventional fashion wtih cement to provide concrete and the treated aggregate may also be advantageously used in other materials, as in asphalt. This is particularly true in those situations where additional strength, water repellency, and greater resistance to weathering or to freezing and thawing is desirable. The treatment is useful in those situations where the material would be subjected to the leaching action of either an acid or basic solution. For example, we have observed that treatment with vaporous organosiliconhalides, as described above, renders hardened concrete and hardened concrete products water repellent as well as much less subject to degradation and/or leaching by either normal or basic or acidic waters. It is believed that this treatment is particularly effective because the vaporous, molecular organosilane quickly and thoroughly permeates the material. The protective coat, thus supplied is not only on the exterior surface of the rock, but is distributed completely throughout the matrix as well.

While in the foregoing specification we have set forth a detailed description of an embodiment of the invention, it will be apparent to those skilled in the art that many modifications in the details herein given may be made without departing from the spirit and the scope of the invention.

We claim:

1. In a method of improving the failure resistance of an aggregate-containing construction material, the steps of contacting argillaceous rocks with a gaseous methyl chlorosilane, and blending said rocks with a cementitious material to form said construction material, said contacting step being characterized by sufficient gas penetration of said rocks to maintain the argillaceous material therein in its original three-dimensional configuration and thereby prevent the development of rock reaction shells.

2. In a method of improving the failure resistance of an aggregate-containing construction material, the steps or contacting argillaceous carbonate rocks with a gaseous methyl chlorosilane, and blending said rocks with a cementitious material to form said construction material, said contacting step being characterized by sufficient gas penetration of said rocks to maintain the argillaceous material therein in its original three-dimensional configuration and thereby prevent the development of rock reaction shells.

3. In a method of improving the failure resistance of an aggregate-containing construction material, the steps of contacting argillaceous carbonate rocks with a gaseous methyl chlorosilane under conditions of substantially complete gas penetration of said rocks, and blending said rocks with cementitious material to form said construction material.

References Cited in the file of this patent

UNITED STATES PATENTS

| | | |
|---|---|---|
| 2,510,661 | Safford | June 6, 1950 |
| 2,563,555 | Safford | Aug. 7, 1951 |
| 2,676,892 | McLaughlin | Apr. 27, 1954 |
| 2,705,206 | Wagner | Mar. 29, 1955 |
| 2,706,688 | Sommer | Apr. 19, 1955 |

FOREIGN PATENTS

| | | |
|---|---|---|
| 154,941 | Australia | Jan. 28, 1954 |